D. V. REEDY.
FREIGHT AND PASSENGER ELEVATOR.
APPLICATION FILED MAR. 14, 1922.

1,435,082.

Patented Nov. 7, 1922.
2 SHEETS—SHEET 1.

Inventor,
Daniel V. Reedy,
By Joseph A. Minturn
Attorney.

D. V. REEDY.
FREIGHT AND PASSENGER ELEVATOR.
APPLICATION FILED MAR. 14, 1922.

1,435,082.

Patented Nov. 7, 1922.
2 SHEETS—SHEET 2.

Inventor,
Daniel V. Reedy.
By
Joseph A. Minturn
Attorney.

Patented Nov. 7, 1922.

1,435,082

UNITED STATES PATENT OFFICE.

DANIEL V. REEDY, OF INDIANAPOLIS, INDIANA.

FREIGHT AND PASSENGER ELEVATOR.

Application filed March 14, 1922. Serial No. 543,591.

*To all whom it may concern:*

Be it known that I, DANIEL V. REEDY, a citizen of the United States, residing at Indianapolis, in the county of Marion and State of Indiana, have invented new and useful Improvements in Freight and Passenger Elevators, of which the following is a specification.

The object of this invention is to cheapen the cost of construction, installation, and upkeep of passenger and freight elevators, and to increase their power and capacity.

I accomplish the above, and other objects which will hereinafter appear, by the mechanism illustrated in the accompanying drawings, in which—

Figure 1:
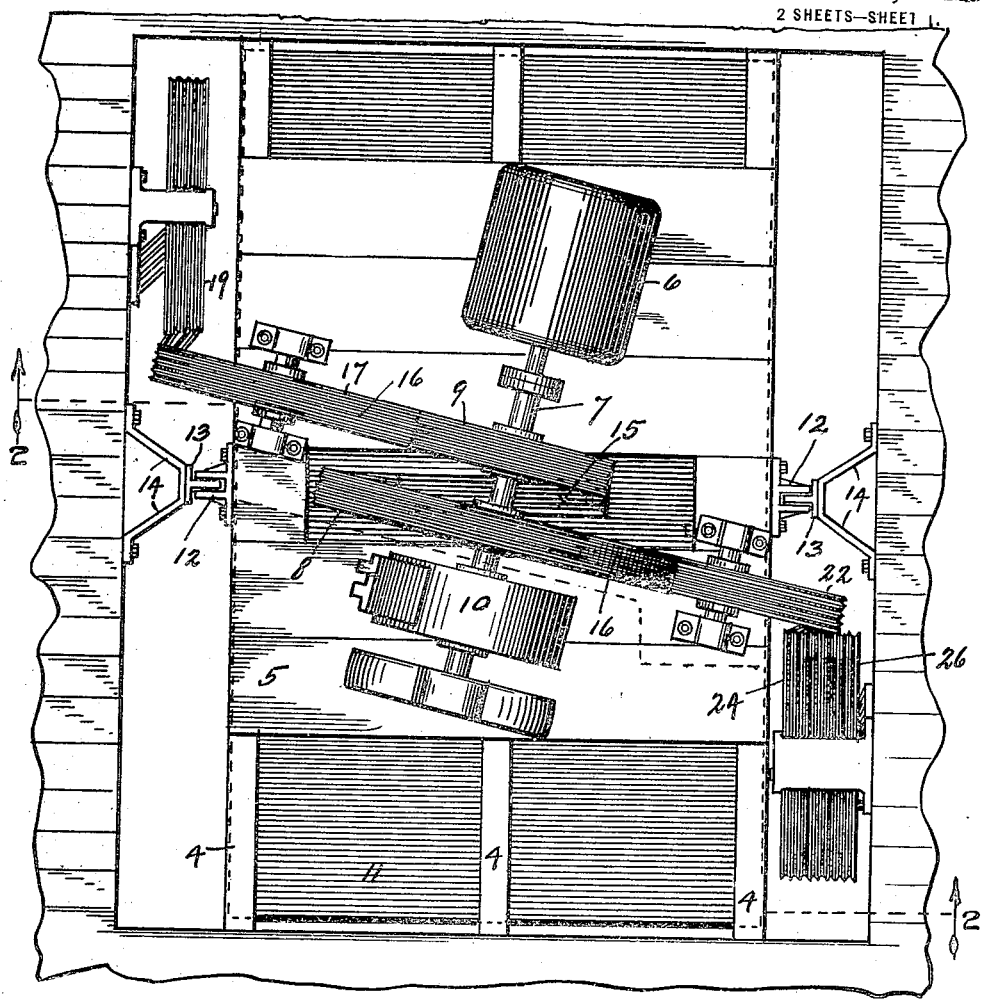
Figure 3:
Figure 2:
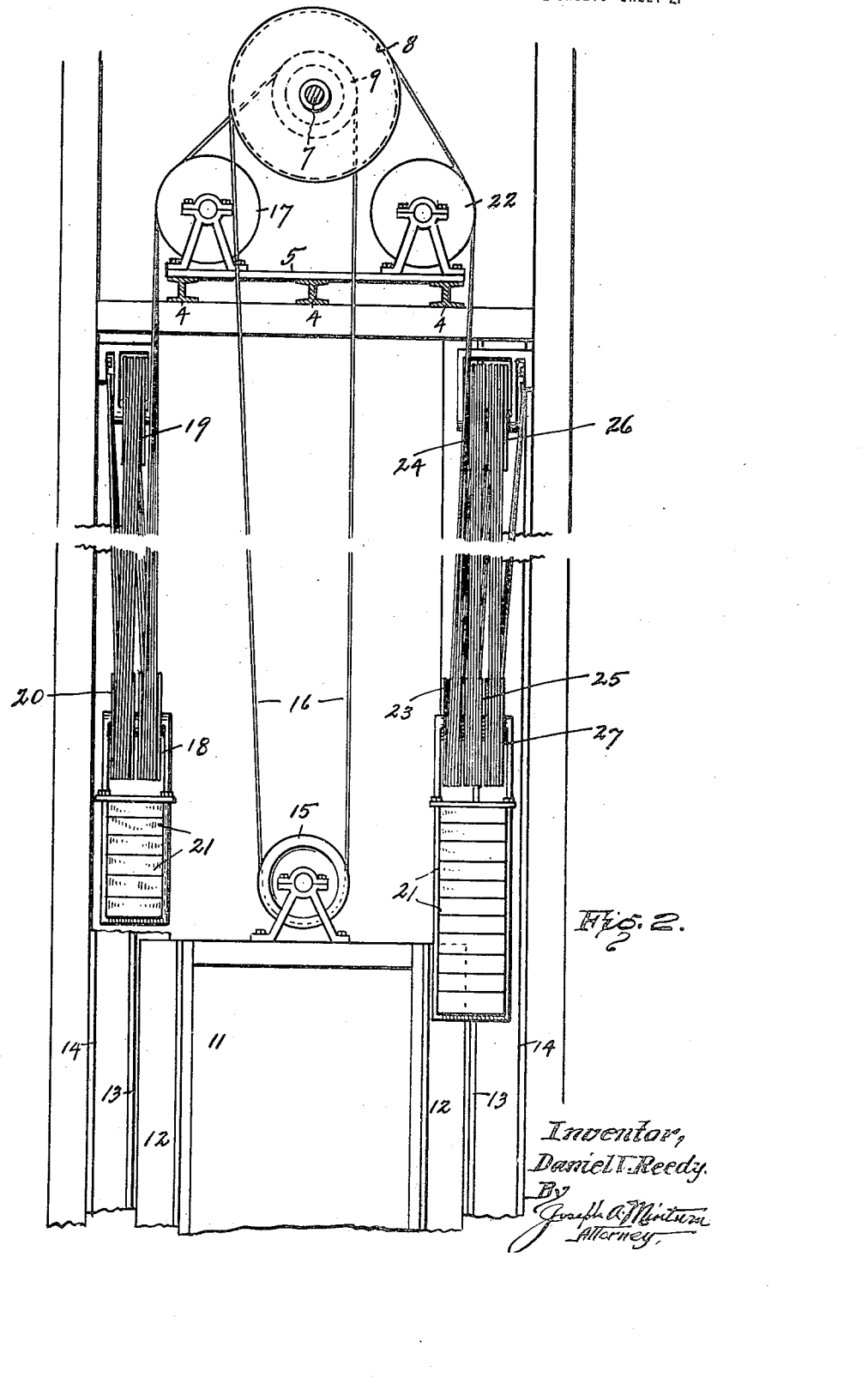

Fig. 1, is a top plan view of an elevator embodying my improvements. Fig. 2, is a vertical section on the line 2—2 of Fig. 1, and Fig. 3, is a portion of the driving-pulley with V-shape grooves.

Like characters of reference indicate like parts in the several views of the drawings.

The elevator hatchway is framed in the usual manner and has top horizontal beams 4, which support a platform 5 on which is a motor 6, having a shaft 7 on which is a cable-pulley 8 and a much smaller cable-pulley 9, here shown as approximately one-half of the diameter of the pulley 8, but this may be varied as required. Also, on the shaft 7 is a brake-drum 10 of usual construction. The drawing shows pulleys 8 and 9 with V-grooves (see Fig. 3) receiving for cables which are thus quadrupled for greater strength and friction, but the number may be more or less than four as desired and half round or other than V-shaped grooves be formed in the pulleys to receive the cables.

A car 11 has vertically channeled guides 12, on opposite sides of the car, which engage corresponding vertical T-rails 13, supported by members 14 from the frame of the hatch. A pulley 15 is mounted on top of the car 11, and continuous cables 16 pass over the pulley 8, thence down and under the pulley 15, and up and over the pulley 9. The cables then pass from pulley 9, over an idler 17, and from there down and under a pulley 18, thence up and over a pulley 19, mounted in a fixed position near the top of the hatchway, thence down and under a pulley 20, and thence up to where the ends are fastened to the frame of the hatchway, opposite the pulley 19. The pulleys 18 and 20, are mounted on the same shaft from which weights 21, sufficient to keep the cables stretched at all times, are suspended.

The other ends of the cables coming over the large pulley 8 pass over an idler 22, thence down and under a movable pulley 23, up and over a fixed pulley 24, down and under a second movable pulley 25, up and over a fixed pulley 26, down and under a third movable pulley 27, and then to where the ends are fastened to the frame of the hatchway opposite the fixed pulleys 24 and 26.

The movable pulleys 23, 25, and 27, are mounted on the same shaft, and from this shaft a series of weights, sufficient to over balance the weight of the car 11, are suspended.

In the operation of my invention the power is multiplied by the difference in ratio of the diameters of the pulleys 8 and 9, and provision is made for keeping the cables taut coming from both pulleys at all positions of travel of the car. The tackle may be from single to multifold, depending upon the working conditions of the assembly.

While I have here shown the preferred form of my invention, it is obvious that variations may be made some of which have been mentioned, without departing from the spirit of my invention, and I therefore do not desire to be held unduly to the construction shown, or any more than is required by the appended claims, and what I claim is—

1. In elevator construction, a car, a pair of pulleys of different diameters rotating together on the same axis, a pulley mounted on the car, a cable passing over the larger of the pair of pulleys, under the pulley on the car and over the smaller of the pair of pulleys, a tackle of one or more movable pulleys mounted on shafts and receiving the cable from each pulley of said pair of pulleys, the ends of the cables being fixed near the upper end of the travel of the car, and counter-weights suspended to the shafts of the movable pulleys of the tackles.

2. In elevator construction, a car, a pair of pulleys of different diameters rotating together on a fixed axis above the car, a pulley mounted on the car, a cable passing over the larger of said pair of pulleys, under the pulley on the car and over the smaller of the pair of pulleys, block and tackle means taking the cable from each one of the pair of pulleys, and weights suspended from said last means.

3. In elevator construction, a car, a pair of pulleys of different diameters rotating together on a fixed axis above the car, a pulley mounted on the car, a cable passing over the larger of the pair of pulleys, under the pulley on the car and over the smaller of the pair of pulleys, idlers over which the cable passes from each of said pair of pulleys, tackles of one or more movable pulleys each receiving the cable from the idlers, and counter-weights suspended from said tackles.

4. In elevator construction, a car, a pair of pulleys of different diameters rotating together on a fixed axis above the car, a pulley mounted on the car, a cable passing over the larger of the pair of pulleys, under the pulley on the car and over the smaller of the pair of pulleys, idlers over which the cable passes from each of said pair of pulleys, one or more stationary pulleys and a larger number of movable pulleys receiving the cables from the larger of the pair of pulleys, the end of the cable being secured to a fixed point, fixed and movable pulleys receiving the cable from the smaller of the pair of pulleys, the end of the cable being secured at a fixed point, and counter-weights suspended from each set of said movable pulleys.

Signed at Indianapolis, Indiana, this the 11th day of March, 1922.

DANIEL V. REEDY.